Patented Aug. 27, 1940

2,212,895

UNITED STATES PATENT OFFICE 2,212,895

PROCESS FOR THE PREPARATION OF ACYL SULPHIDES AND PRODUCTS RESULTING THEREFROM

Clyve C. Allen, San Francisco, Calif., assignor to Shell Development Company, San Francisco, Calif., a corporation of Delaware No Drawing. Application December 27, 1938, Serial No. 247,950

25 Claims. (Cl. 260—455)

This invention relates to a method for preparing acyl sulphides from mercaptans, and to certain novel and useful products resulting therefrom. More particularly the invention is concerned with the production of acyl sulphides by reacting mercaptans with reactants of the class consisting of carboxylic acids and carboxylic acid anhydrides while removing at least one of the reaction products from the reaction mixture substantially as soon as it is formed.

An object of the present invention is to provide a simple and economical process for manufacture of acyl sulphides which employs reagent materials readily available in the markets of the world at moderate cost. Another object of the invention is to provide a direct method for producing acyl sulphides from the readily available reagent materials which does not require the preparation of intermediate compounds in order to obtain the acyl sulphides desired.

The term acyl sulphide used in this specification and the accompanying claims refers to compounds containing the group

where the free bonds are linked to carbon atoms of organic radicals. The acyl sulphides are also known in the chemical literature as thiol esters.

In the process, a mercaptan is reacted with a reactant of the class consisting of carboxylic acids and carboxylic acid anhydrides and at least one of the reaction products is separated from the reaction mixture substantially as soon as formed.

In the case of the preparation of an acyl sulphide by reaction of a mercaptan with a carboxylic acid, the reaction products are the acyl sulphide and water. This reaction may be represented by the equation

R—SH+R'—COOH⇌R—S—CO—R'+H₂O wherein R—SH designates a mercaptan, R'—COOH designates a carboxylic acid, and R—S—CO—R' designates the acyl sulphide. When a mercaptan is mixed with a carboxylic acid under conditions at which reaction occurs, a state of dynamic equilibrium is established between these substances and the acyl sulphide and water if sufficient time is allowed to elapse. In order to obtain a maximum yield of acyl sulphide, the formed acyl sulphide and/or the water is separated from the reaction mixture substantially about as fast as formed by some suitable means.

In the case of the preparation of an acyl sulphide from a mercaptan and a carboxylic acid anhydride, the products of the reaction are the acyl sulphide and a carboxylic acid. This reaction is indicated by the equation

R—SH+(R'—CO)₂O⇌R—S—CO—R'+R'—COOH wherein R—SH represents a mercaptan, (R'—CO)₂O represents a carboxylic acid anhydride, R—S—CO—R' represents the formed acyl sulphide, and R'—COOH represents the formed carboxylic acid. In this case also, the most favorable results are obtained when at least one of the reactants is removed from the reaction mixture substantially as soon as formed.

Suitable means for separating at least one of the reaction products from the reaction mixture may be by operations such as fractional distillation, azeotropic distillation, extraction, stratification, centrifugation, and the like. In the case of the reaction of mercaptan with a carboxylic acid, another suitable means is to add to the reaction mixture an anhydrous salt which is capable of adding water of crystallization and which thus combines with the formed water.

In order to increase the rate of reaction, a catalyst is preferably added to the reaction mixture. Suitable catalysts which may be employed are the strong mineral and organic acids and acid-acting salts. Strong mineral acids include H₂SO₄, H₂S₂O₇, H₃PO₄, HPO₃, H₄P₂O₇, HCl, HBr, HClO₃, HClO₄, HNO₃ and the like while representative strong organic acids include benzene sulphonic acid and its homologues and analogues, dialkyl and acid alkyl sulphates, alkylated phosphoric and sulphonic acids, etc. If desired, acid-acting salts may be used such as ZnSO₄, ZnCl₂, ZnBr₂, FeCl₃, AlCl₃, CoCl₃, NiCl₂, Fe₂(SO₄)₃, Al₂(SO₄)₃, NaHSO₄, ZnH₂(SO₄)₂, NaH₂PO₄ and the like. By the use of a catalyst, the formation of acyl sulphide may be made to proceed at a rate which enables this process to be used commercially.

The mercaptan employed in the process may be saturated aliphatic compounds and they may contain primary, secondary or tertiary carbon atoms. Representative mercaptans of this class which may be used are methyl mercaptan, ethyl mercaptan, normal propyl mercaptan, isopropyl mercaptan, normal butyl mercaptan, isobutyl mercaptan, secondary butyl mercaptan, tertiary butyl mercaptan, normal amyl mercaptan, isoamyl mercaptan, methyl propyl thiocarbinol, methyl isopropyl thiocarbinol, diethyl thiocarbinol, tertiary amyl mercaptan, etc. Aromatic mercaptans with the mercaptan group linked directly to the aromatic nucleus such as phenyl mercaptan, tolyl mercaptan, xylyl mercaptan, naphthyl mercaptan, etc., may be used as well as aralkyl compounds with the aromatic nucleus separated from the mercaptan group by intervening carbon atoms in a chain like benzyl mercaptan, phenylethyl mercaptan, tolylpropyl mercaptan, etc. A preferred group of mercaptans which may be used are the unsaturated mercaptans such as allyl mercaptan, crotyl mercaptan, methallyl mercaptan, methyl vinyl thiocarbinol, methyl allyl thiocarbinol, methyl methallyl thiocarbinol, methyl isopropenyl thiocarbinol, dimethyl vinyl thiocarbinol, methyl ethyl allyl thiocarbinol, diethyl methallyl thiocarbinol, cinnamyl mercaptan, etc.

The mercaptans are reacted with a reactant of the class consisting of carboxylic acids and carboxylic anhydrides. Carboxylic acids and carboxylic acid anhydrides which are suitable for use in the process are saturated or unsaturated aliphatic or aromatic compounds and they may be either monobasic or polybasic in character. Representative monocarboxylic acids which may be used are formic acid, acetic acid, propionic acid, butyric acid, isobutyric acid, valeric acid, isovaleric acid, methylethylacetic acid, trimethyl acetic acid, caproic acid, palmitic acid, stearic acid, acrylic acid, crotonic acid, methacrylic acid, angelic acid, tiglic acid, oleic acid, linoleic acid, benzoic acid, toluic acid, xylylic acid, etc. Typical polybasic acids which may be used are oxalic acid, malonic acid, succinic acid, glutaric acid, adipic acid, fumaric acid, maleic acid, phthalic acid, etc. Both symmetrical and mixed carboxlic acid anhydrides may be used. Representative symmetrical carboxylic acid anhydrides are acetic anhydride, propionic anhydride, butyric anhydride, isobutyric anhydride, valeric anhydride, isovaleric anhydride, caproic anhydride, palmitic anhydride, stearic anhydride, acrylic anhydride, crotonic anhydride, angelic anhydride, tiglic anhydride, benzoic anhydride, etc., while representative mixed anhydrides are acetic propionic anhydride, propionic butyric anhydride, acetic butyric anhydride, acetic isobutyric anhydride, acetic crotonic anhydride, propionic tiglic anhydride, acetic benzoic anhydride, crotonic benzoic anhydride, etc. Internal anhydrides from dibasic acids are also suitable for use such as succinic anhydride, glutaric anhydride, maleic anhydride, phthalic anhydride, etc.

Many novel and useful products may be manufactured by the process. Allyl acetyl sulphide and methallyl acetyl sulphide are typical of the new substances which may be prepared. A few properties of these acyl sulphides are listed below.

mixture separated into two phases; the aqueous phase was removed, the residue washed with aqueous 5% potassium carbonate solution and then dried over sodium sulphate. Fractional distillation of the dry product yielded about 114 gms. of allyl acetyl sulphide.

*Example II*

A mixture of approximately 441 gms. of methallyl mercaptan, 510 gms. of acetic anhydride, and one gm. of concentrated (95%) sulphuric acid was refluxed under a trap to exclude air and then material distilling below 122° C. was fractionated from the reaction mixture. The residue was poured into two kilograms of ice and salt added to separate an oily phase. The oily phase was washed with three liters of 5% potassium carbonate, dried over sodium sulphate and fractionally distilled. About 236 gms. of methallyl acetyl sulphide were obtained by the distillation.

If desired, at least one of the reaction products can be removed from the reaction mixture substantially as soon as formed such as, for example, by distillation at a subatmospheric pressure in Example I and by immediately distilling the acetic acid from the mixture in Example II.

The allyl acetyl sulphide and methallyl sulphide are included in the general class of compounds which may be prepared by the process and which may be represented by the general formula $$R_1-S-CO-R_2$$

wherein $R_1$ indicates an organic radical containing an unsaturated aliphatic carbon atom and $R_2$ indicates an organic radical with an aliphatic carbon atom linked to the carbonyl group of the acyl sulphide. $R_1$ is an organic group such as alkenyl, aralkenyl, cyclo-olefinic, and the like together with these groups which have one or more of their hydrogen atoms substituted with suitable organic or inorganic groups. $R_2$ is an organic group such as alkyl, alkenyl, aralkyl, aralkenyl, alicyclic, cyclo-olefinic and the like which also may have one or more of their hydrogen atoms substituted with suitable organic and inorganic groups such as halogens, alkoxy, aryloxy, aralkoxy, etc.

The execution of the reaction of mercaptans with a carboxylic acid or carboxylic acid anhydride may be done in a wide variety of manners. A preferred mode of operation is to allow the reaction to proceed in a suitable vessel equipped with a means for heating and boiling its contents and, if desired, with an agitating device. The reaction vessel may be connected to a fractionating column having suitable condensing and cooling

|  | Allyl acetyl sulphide | Methallyl acetyl sulphide |
|---|---|---|
| Structure |  $CH_3-\overset{O}{\underset{\|}{C}}-S-CH_2-CH=CH_2$ | $CH_3-\overset{O}{\underset{\|}{C}}-S-CH_2-\overset{CH_3}{\underset{\|}{C}}=CH_2$ |
| Boiling point, °C | 136.0–136.8 | 157.5–159.5 |
| Specific gravity, 20/4 | 1.0325 | 0.9645 |
| Refractive Index, 20/D | 1.435 | 1.483 |

The following examples are given for the purpose of illustrating how these substances were prepared.

*Example I*

A solution of about 78 gms. of allyl mercaptan, 175 gms. of acetic anhydride and 0.25 gm. of concentrated (95%) sulphuric acid was kept at room temperature for several days and then poured into one kilogram of ice-water. The means for obtaining a distillate. The reaction mixture is boiled and at least one of the reaction products is removed as a distillate substantially as soon as formed. When the reactants are a mercaptan and a carboxylic acid, it is preferred to remove the formed water from the reaction mixture by means of azeotropic distillation. To enable this to be accomplished, a substance is added to the reaction mixture which forms an azeotrope with water. In the case of the reaction of a mercaptan with a carboxylic acid anhydride, preference is made for removal of the formed carboxylic acid by fractional distillation.

For the added substances which will form an azeotrope with water, suitable materials are those which are substantially inert to the compounds in the reaction mixture. Preferred substances which form azeotropes with water are hydrocarbons such as benzene, toluene, xylene, pentane, hexane, iso-octane, naphtha, gasoline fractions, etc.; halogenated hydrocarbons such as carbon tetrachloride, chloroform, ethylene dichloride, propylene dichloride, butylene dichloride, ethylene dibromide, trichlorethylene, phenyl chloride, etc.; symmetrical ethers such as diethyl ether, diisopropyl ether, dibutyl ethers, diamyl ethers, diallyl ether, dimethallyl ether, etc.; mixed ethers such as ethyl isopropyl ether, propyl butyl ethers, isopropyl tertiary butyl ether, secondary butyl ether, tertiary butyl ether, allyl isopropyl ether, ethyl methallyl ether, etc.; and organic sulphides and polysulphides such as diethyl sulphide, dipropyl sulphides, dibutyl sulphides, ethyl propyl sulphides, propyl butyl sulphides, diallyl sulphide, dimethallyl sulphide, diethyl disulphide, dipropyl disulphides, dibutyl disulphides, ethyl propyl disulphides, propyl butyl disulphides, diallyl disulphide, dimethallyl disulphide, etc.

Owing to the fact that no fractionating device is perfect and because of the peculiarities of the azeotropes formed, some quantities of the reactants may be removed from the reaction mixture along with the reaction products. It may therefore be desirable to purify or partially purify these reactants and return them to the reaction mixture or they may be utilized as supplies for future reactions.

The reactants, catalyst, and added substance may be introduced into the reaction vessel independently or they may be mixed prior to their introduction therein. Ordinarily an excess of carboxylic acid or carboxylic acid anhydride is preferably employed over the mercaptan, but when desired equimolecular proportions or an excess of mercaptans may be used. In the majority of cases it is preferable to react a single mercaptan with a single carboxylic acid anhydride so as to obtain only one acyl sulphide; however, a single mercaptan may be reacted with a mixture of several species of carboxylic acids or carboxylic acid anhydrides, a mixture of several species of mercaptans may be reacted with a single carboxylic acid or carboxylic acid anhydride, or a mixture of several species of mercaptans may be reacted with a mixture containing a number of species of carboxylic acids or carboxylic acid anhydrides so that a mixture of acyl sulphides is obtained which may be utilized per or instead, may be separated into individual constituents by any suitable means such as fractionation.

It is usually preferable to allow the reaction of a mercaptan with a carboxylic acid or carboxylic acid anhydride to proceed at the boiling temperature of the reaction mixture under normal atmospheric pressure. While this is true in most cases, some mercaptans tend to decompose when heated above room temperature and it is preferred to react these with carboxylic acid anhydrides at about room temperature. The use of diluents and decomposition or polymerization inhibitors is also helpful when reacting these unstable mercaptans. Allyl mercaptan is an example of a mercaptan which decomposes when heated substantially above room temperature. When a marcaptan and a carboxylic acid anhydride are reacted at about room temperature, sufficient time must be allowed for the reaction to approach completion; otherwise poor yields of acyl sulphide will be obtained owing to the slowness of the reaction at this temperature. When it is desired to maintain the reaction mixture at about room temperature, it is evident that the removal of one of the reaction products by distillation may be accomplished at subatmospheric pressures. Superatmospheric pressures may be used when it is desired to operate at higher temperatures than the normal boiling temperature of the reaction mixture. In fact, any suitable temperature and pressure may be used in the process depending upon the conditions of the reactions, the properties of the reactants and reaction products, and the method of separation and recovery to be utilized.

It will be apparent that the process is adaptable to batch, intermittent or continuous operation. The reactions and purification of reaction products may be effected in one or a plurality of communicating stages. When it is desired, the reactants may be introduced into the reaction stage or stages at about the same rate that reaction products or reaction products and unreacted reactants are withdrawn so as to maintain the volume of materials in the reaction stage or stages substantially constant. Unreacted reactants separated or partially separated from the reaction products may be reintroduced into the reaction stage or stages.

I have found the reaction of mercaptans with carboxylic acid anhydrides to give somewhat better yields of acyl sulphide than the reaction of mercaptans with carboxylic acids. The lower carboxylic acid anhydrides such as acetic anhydride and propionic anhydride are readily available while the higher carboxylic acid anhydrides are not. In order to prepare acyl sulphides of higher carboxylic acids which are not readily available in the form of anhydrides, an acyl sulphide may be prepared from a readily available carboxylic acid anhydride and this acyl sulphide reacted with the higher carboxylic acid so as to obtain the acyl sulphide of the higher carboxylic acid. This procedure may be used instead of preparing as an intermediate compound the carboxylic acid anhydride of the higher carboxylic acid which could then be reacted with the mercaptan to give the acyl sulphide desired.

The acyl sulphides prepared by my method are useful as insecticides, fungicides and insectifuges. The acyl sulphides are also suitable as solvents for nitrocellulose and resins in a wide variety of coating compositions, as well as for solvents in various extraction processes. Certain of the acyl sulphides are valuable as chemical intermediates for the manufacture of numerous products.

The following examples are introduced for illustrative purposes only of certain modes and conditions of operation of this invention.

*Example III*

A mixture of approximately 90 gms. of normal butyl mercaptan, 180 gms. of acetic acid, 3.5 gms. of concentrated (95%) sulphuric acid, and 80 gms. of benzene was refluxed under a fractionating column equipped with an overhead settling chamber. An aqueous phase weighing 13 gms. separated from the distillate during the refluxing period. The reaction mixture was then treated with ice-water, dried and fractionally distilled. A fraction of the distillate consisting of about 23 gms. was normal butyl acetyl sulphide.

Example IV

A solution of approximately 95 gms. of normal butyl mercaptan, 153 gms. of acetic anhydride and one gm. of concentrated (95%) sulphuric acid was refluxed under a fractionating column and material (mainly acetic acid) distilling below 132° C. was removed. The reaction mixture was then cooled and sodium hydroxide added in an amount equivalent to the sulphuric acid present. The mixture on being fractionally distilled yielded about 80 gms. of normal butyl acetyl sulphide.

It is to be understood that my invention is to be limited in scope only by the following claims, and it is not to be dependent on the accuracy of the theories advanced to explain the advantageous results obtained, nor is it to be limited by the preferred embodiments and variations thereof which were described in the foregoing only for the purpose of making the invention more clear.

I claim as my invention:

1. A process for the production of an acyl sulphide which comprises reacting a mercaptan with a carboxylic acid in the presence of sulphuric acid as catalyst and benzene while distilling the water formed by the reaction from the reaction mixture as an azeotrope with the benzene substantially as soon as the water is formed.

2. A process for the production of an acyl sulphide which comprises reacting a mercaptan with a carboxylic acid in the presence of a mineral acid catalyst while distilling at least one of the reaction products from the reaction mixture substantially as soon as it is formed.

3. A process for the production of an acyl sulphide which comprises reacting a mercaptan containing an unsaturated aliphatic carbon atom with a carboxylic anhydride in the presence of a catalyst.

4. A process for the production of an acyl sulphide which comprises reacting a mercaptan containing an unsaturated aliphatic carbon atom with a carboxylic anhydride in the presence of a catalyst while removing at least one of the reaction products from the reaction mixture substantially as soon as it is formed.

5. A process for the production of an acyl sulphide which comprises reacting a mercaptan with a carboxylic acid anhydride in the presence of sulphuric acid as catalyst while distilling the carboxylic acid formed by the reaction from the reaction mixture substantially as soon as the carboxylic acid is formed.

6. A process for the production of an acyl sulphide which comprises reacting a mercaptan with a carboxylic acid anhydride in the presence of a mineral acid catalyst while distilling at least one of the reaction products from the reaction mixture substantially as soon as it is formed.

7. A process for the production of an acyl sulphide which comprises reacting a mercaptan with an organic compound of the class consisting of carboxylic acids and carboxylic acid anhydrides in the presence of a catalyst while removing at least one of the reaction products from the reaction mixture substantially as soon as it is formed.

8. A process for the production of an acyl sulphide which comprises reacting a mercaptan with an organic compound of the class consisting of carboxylic acids and carboxylic acid anhydrides in the presence of an added substance which is substantially inert under the reaction conditions but is capable of forming an azeotrope with at least one of the reaction products while distilling at least one of the reaction products from the reaction mixture as an azeotrope with the added substance substantially as soon as the reaction product is formed.

9. A process for the production of an acyl sulphide which comprises reacting a mercaptan with an organic compound of the class consisting of carboxylic acids and carboxylic acid anhydrides while distilling at least one of the reaction products from the reaction mixture substantially as soon as it is formed.

10. A process for the production of an acyl sulphide which comprises reacting a mercaptan with an organic compound of the class consisting of carboxylic acids and carboxylic acid anhydrides while removing at least one of the reaction products from the reaction mixture substantially as soon as it is formed.

11. Methallyl acetyl sulphide.

12. An acyl sulphide of the general formula $R_1-S-CO-R_2$, wherein $R_1$ represents a methallyl group and $R_2$ represents an organic radical with an aliphatic carbon atom linked to the carbonyl group of the acyl sulphide.

13. An acyl sulphide of the general formula $R_1-S-CO-R_2$, wherein $R_1$ represents the methallyl group and $R_2$ represents an alkyl group.

14. An acyl sulphide of the general formula $R_1-S-CO-R_2$, wherein $R_1$ represents an organic radical containing an unsaturated aliphatic tertiary carbon atom linked directly to a saturated carbon atom which in turn is linked directly to the sulphur atom of the acyl sulphide, and $R_2$ represents an organic radical with an aliphatic carbon atom linked to the carbonyl group of the acyl sulphide.

15. Allyl acetyl sulphide.

16. An acyl sulphide of the general formula $R_1-S-CO-R_2$, wherein $R_1$ represents the allyl radical and $R_2$ represents an alkyl radical.

17. An acyl sulphide of the general formula $R_1-S-CO-R_2$, wherein $R_1$ represents an allyl radical and $R_2$ represents an organic radical with an aliphatic carbon atom linked to the carbonyl group of the acyl sulphide.

18. An acyl sulphide of the general formula $R_1-S-CO-R_2$, wherein $R_1$ represents an alkenyl group containing at least three carbon atoms in a chain with two of the carbon atoms linked by an olefinic double bond, one of which is linked directly to a saturated carbon atom which in turn is linked directly to the sulphur atom of the acyl sulphide, and $R_2$ represents an organic radical with an aliphatic carbon atom linked to the carbonyl group of the acyl sulphide.

19. An acyl sulphide of the general formula $R_1-S-CO-R_2$, wherein $R_1$ represents an organic radical containing at least three carbon atoms in a chain with two of the carbon atoms linked by an olefinic double bond, one of which is linked directly to a saturated carbon atom which in turn is linked directly to the sulphur atom of the acyl sulphide, and $R_2$ represents an organic radical with an aliphatic carbon atom linked to the carbonyl group of the acyl sulphide.

20. An acyl sulphide of the general formula $R_1-S-CO-R_2$, wherein $R_1$ represents an organic radical containing an unsaturated aliphatic carbon atom and $R_2$ represents an organic radical with an aliphatic carbon atom linked to the carbonyl group of the acyl sulphide.

21. A process for the production of an acyl sulphide of a relatively higher boiling carboxylic acid which comprises reacting a mercaptan with a relatively lower boiling carboxylic acid anhydride while removing at least one of the reaction products from the reaction mixture substantially as soon as it is formed, separately recovering the acyl sulphide of such relatively lower boiling carboxylic acid anhydride, and reacting said acyl sulphide with a relatively higher boiling carboxylic acid thereby forming the acyl sulphide thereof.

22. A process for the production of an acyl sulphide which comprises reacting a mercaptan with a relatively lower boiling carboxylic acid anhydride while removing at least one of the reaction products from the reaction mixture substantially as soon as it is formed, separately recovering the acyl sulphide thus produced, reacting said acyl sulphide with a carboxylic acid having a higher boiling point as compared to the carboxylic acid anhydride employed for the esterification of the mercaptan, thereby forming the acyl sulphide of such relatively higher boiling carboxylic acid, and removing at least one of the reaction products from the reaction mixture substantially as soon as it is formed.

23. The process according to claim 22 wherein the removal of the reaction product from the reaction mixture is effected by distillation.

24. The process according to claim 22 wherein the removal of at least one of the reaction products from the reaction mixture is effected by azeotropic distillation with an added substance substantially inert under the reaction conditions but capable of forming an azeotrope with at least one of the reaction products.

25. A process for the production of an acyl sulphide of a relatively higher boiling carboxylic acid which comprises reacting an acyl sulphide of a relatively lower boiling carboxylic acid with a relatively higher boiling carboxylic acid thereby producing a reaction mixture containing the acyl sulphide of the relatively higher boiling carboxylic acid and a relatively lower boiling carboxylic acid, and removing at least one of the reaction products from the reaction mixture substantially as soon as it is formed.

CLYVE C. ALLEN.